US012137861B2

(12) United States Patent
Buogo et al.

(10) Patent No.: US 12,137,861 B2
(45) Date of Patent: Nov. 12, 2024

(54) DOSING UNIT AND WATER-BEARING HOUSEHOLD APPLIANCE WITH AN AUTOMATIC DOSING SYSTEM

(71) Applicants: RECKITT BENCKISER (BRANDS) LIMITED, Berkshire (GB); BSH HAUSGERÄTE GMBH, Munich (DE)

(72) Inventors: Alberto Buogo, Hull (GB); Jakob Schultz, Munich (DE); Alexander Schiele, Munich (DE); Henry Matthew Lawrence Fletcher, Cambridgeshire (GB); Jon Whadcoat, Cambridgeshire (GB)

(73) Assignees: Reckitt Benckiser (Brands) Limited, Slough (GB); BSH Hausgeräte GMBH, Munich (DE)

( * ) Notice: Subject to any disclaimer, the term of this patent is extended or adjusted under 35 U.S.C. 154(b) by 448 days.

(21) Appl. No.: 17/630,736

(22) PCT Filed: Jul. 29, 2020

(86) PCT No.: PCT/EP2020/071350
§ 371 (c)(1),
(2) Date: Jan. 27, 2022

(87) PCT Pub. No.: WO2021/018940
PCT Pub. Date: Feb. 4, 2021

(65) Prior Publication Data

US 2022/0257088 A1 Aug. 18, 2022

(30) Foreign Application Priority Data

Aug. 1, 2019 (EP) .................................... 19189552
Aug. 1, 2019 (GB) ..................................... 1910963

(51) Int. Cl.
*A47L 15/44* (2006.01)
*C11D 17/00* (2006.01)
*D06F 39/02* (2006.01)

(52) U.S. Cl.
CPC ......... *A47L 15/4463* (2013.01); *A47L 15/449* (2013.01); *C11D 17/0047* (2013.01); *D06F 39/026* (2013.01)

(58) Field of Classification Search
CPC ............... A47L 15/4463; A47L 15/449; C11D 17/0047; D06F 39/026
(Continued)

(56) References Cited

U.S. PATENT DOCUMENTS

2005/0230427 A1 10/2005 Salvati et al.
2007/0062564 A1 3/2007 Farano
2020/0113410 A1 4/2020 Marin et al.

FOREIGN PATENT DOCUMENTS

CN 104631055 A 5/2015
CN 105200723 A 12/2015
(Continued)

OTHER PUBLICATIONS

CN106555306A—machine translation (Year: 2017).*
(Continued)

*Primary Examiner* — Tinsae B Ayalew
(74) *Attorney, Agent, or Firm* — Dunlap Codding, P.C.

(57) ABSTRACT

A dosing unit for automatically dosing at least one detergent tablet provided by a storage cartridge for storing a plurality of detergent tablets, for use in an automatic dosing system of a water-bearing household appliance, wherein the storage cartridge comprises a container with a bottom side forming an inclination angle with a horizontal direction when the dosing unit is arranged as intended for use, wherein an outlet is formed in the container at a lower end of the bottom side,
(Continued)

such that detergent tablets on the bottom side move towards the outlet driven by gravity (G), and wherein a dosing device is attached to the storage cartridge on the outlet, the dosing device including a scoop and a plug, wherein the scoop is configured to separate a detergent tablet from the plurality and transport the separated detergent tablet to a receiving chamber formed in the plug when the scoop is turned in a first turning direction about a rotational axis (X) that is parallel to the bottom side, and the plug is configured to release the detergent tablet from the receiving chamber.

16 Claims, 6 Drawing Sheets

(58) Field of Classification Search
USPC .......................................................... 134/58 D
See application file for complete search history.

(56) References Cited

FOREIGN PATENT DOCUMENTS

| | | | |
|---|---|---|---|
| CN | 106400404 | A | 2/2017 |
| CN | 106555306 | A | 4/2017 |
| CN | 108601501 | A | 9/2018 |
| CN | 109996917 | A | 7/2019 |
| DE | 102017208702 | A1 | 11/2018 |
| EP | 1159913 | A1 | 12/2001 |
| GB | 2557201 | A | 6/2018 |
| KR | 20030048507 | A | 6/2003 |
| KR | 20030048508 | A | 6/2003 |
| KR | 20030056727 | A | 7/2003 |
| WO | 02058528 | A1 | 8/2002 |
| WO | 2012032313 | A1 | 3/2012 |
| WO | 2019063971 | A1 | 4/2019 |

OTHER PUBLICATIONS

EP1159913B1—machine translation (Year: 2004).*
International Search Report and Written Opinion dated Sep. 8, 2020 issued in corresponding PCT international Application No. PCT/EP2020/071350.
UKIPO; Combined Search and Exam Report dated Jan. 24, 2020, in GB1910963.6, filed Aug. 1, 2019.
CNIPO; First Office Action dated Jan. 21, 2024, in CN202080050778.7, filed Aug. 1, 2019.

* cited by examiner

DOSING UNIT AND WATER-BEARING HOUSEHOLD APPLIANCE WITH AN AUTOMATIC DOSING SYSTEM

CROSS-REFERENCE TO RELATED APPLICATIONS

This application is a U.S. National Phase of International Patent Application No. PCT/EP2020/071350, filed on 29 Jul. 2019, which claims priority to United Kingdom Application Serial No. 1910963.6 filed 1 Aug. 2019 and European Application Serial No. 19189552.3 filed 1 Aug. 2019. The entire contents of these applications are incorporated herein by reference in their entirety.

BACKGROUND

The present invention relates to a dosing unit for use in an automatic dosing system of a water-bearing household appliance and a respective water-bearing household appliance with an automatic dosing system.

Known water-bearing household appliances, for example dishwashers, typically have a dosing system, which consists of a chamber for storing a single dose of detergent. The user of the dishwasher has to fill the chamber with the detergent each time before starting a washing cycle. This is inconvenient for the user. Furthermore, such systems bear the risk that the user does not fill in the correct amount of detergent or forgets to fill in detergent at all. This can lead to bad or undesirable cleaning results. It is desired that an automatic dosing system is available, which automatically doses the correct amount of detergent at the correct timings during a washing cycle.

It is one objective of the invention to improve the dosing of detergent in a household appliance.

BRIEF SUMMARY OF THE INVENTION

In one aspect, the present invention is directed to a dosing unit for automatically dosing at least one detergent tablet provided by a storage cartridge for storing a plurality of detergent tablets, for use in an automatic dosing system of a water-bearing household appliance, wherein the storage cartridge comprises a container with a bottom side forming an inclination angle with a horizontal direction when the dosing unit is arranged as intended for use, wherein an outlet is formed in the container at a lower end of the bottom side, such that detergent tablets on the bottom side move towards the outlet driven by gravity, and wherein a dosing device is attached to the storage cartridge on the outlet, the dosing device including a scoop and a plug, wherein the scoop is configured to separate a detergent tablet from the plurality and transport the separated detergent tablet to a receiving chamber formed in the plug when the scoop is turned in a first turning direction about a rotational axis that is parallel to the bottom side, and the plug is configured to release the detergent tablet from the receiving chamber.

In another aspect, the present invention provides a water-bearing household appliance with an automatic dosing system and a dosing unit according to any of the embodiments described herein, the automatic dosing system being configured for automatically dosing at least one detergent tablet from the dosing unit.

These and other objects, features and advantages of the present invention will become more apparent upon reading the following specification in conjunction with the accompanying description, claims and drawings.

BRIEF DESCRIPTION OF THE DRAWINGS

The accompanying Figures, which are incorporated in and constitute a part of this specification, illustrate several aspects described below.

In the Figures, like reference numerals designate like or functionally equivalent elements, unless otherwise indicated.

DETAILED DESCRIPTION OF THE INVENTION--

Figure 1:
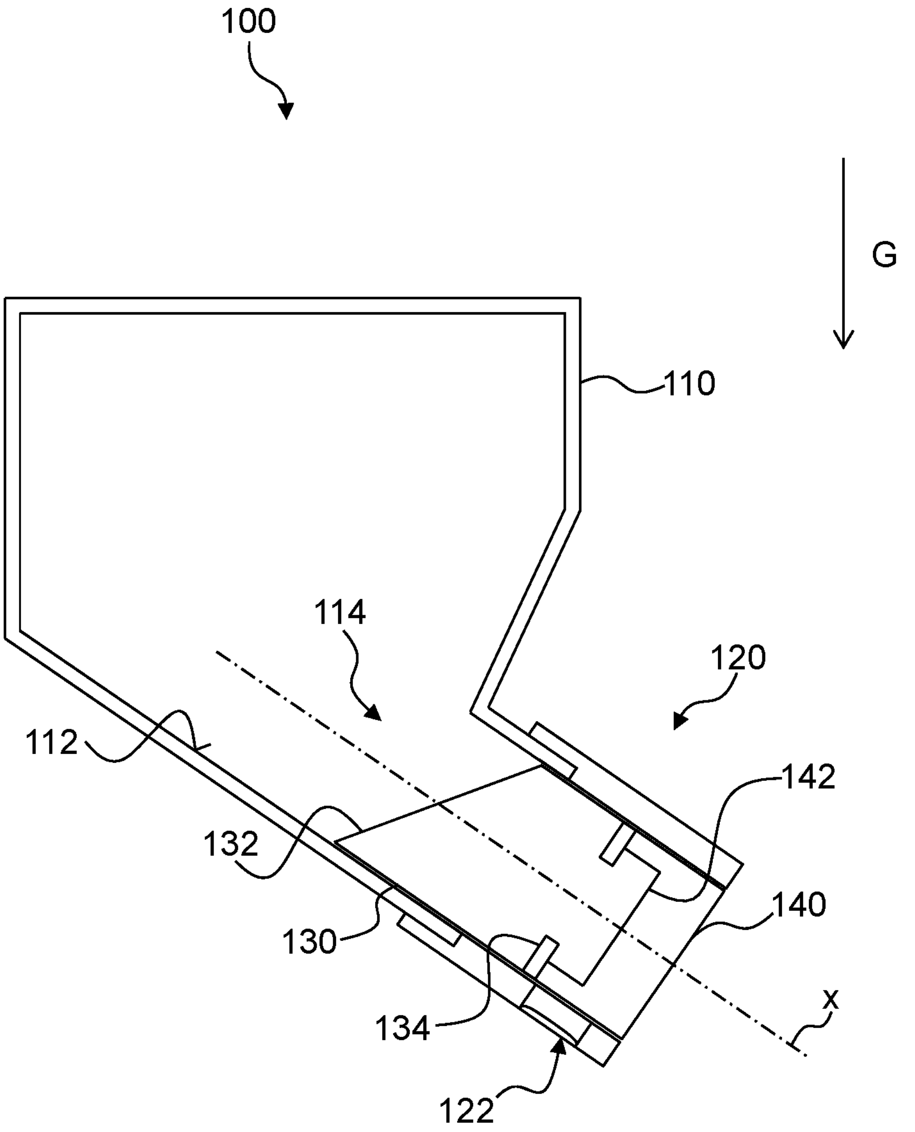
FIG. 1 shows a schematic view of a first example of a dosing unit.

According to a first aspect, a dosing unit for automatically dosing at least one detergent tablet provided by a storage cartridge for storing a plurality of detergent tablets, for use in an automatic dosing system of a water-bearing household appliance, is suggested. The storage cartridge comprises a container with a bottom side forming an inclination angle with a horizontal direction when the dosing unit is arranged as intended for use. An outlet is formed in the container at a lower end of the bottom side, such that detergent tablets on the bottom side move towards the outlet driven by gravity. A dosing device is attached to the storage cartridge on the outlet, the dosing device including a scoop and a plug, wherein the scoop is configured to separate a detergent tablet from the plurality and transport the separated detergent tablet to a receiving chamber formed in the plug, when the scoop is turned in a first rotational direction about an axis that is parallel to the bottom side, and the plug is configured to release the detergent tablet from the receiving chamber.

The dosing unit may favorably be used in a water-bearing household appliance, in particular a dishwasher or a washing machine, for providing detergent for multiple treatment cycles, without the need to fill in detergent before each cycle. Preferably, the dosing unit can be actuated automatically, for example by a control unit of the water-bearing household appliance. The detergent tablets may be any kind of detergent, that is, a chemical formulation that dissolves, at least partially, in a washing liquor for treating articles and is suitable for enhancing the treatment of the articles by the washing liquor. For example, the detergent includes enzymes, a bleaching agent, a softening agent, a rinse aid, and/or further detergents.

The dosing unit may comprise several elements, such as the dosing device and the storage cartridge, even if not mentioned explicitly. The elements of the dosing unit are preferably made from polymeric materials which are suitable for injection molding. Additionally, the elements may be made from metal and/or a composite material and/or the elements may be coated.

The dosing unit has the advantage that gravity assists in or drives transport of the detergent tablets to the dosing device, which separates at least one detergent tablet from the plurality and releases them. Thus, only the dosing device has moveable elements, wherein the storage cartridge remains static during the dosing operation.

The dosing device is attached to an opening or outlet of the storage cartridge, which is in communication with the outlet of the container. It is noted that the container can be a specific part, but can also be the interior of the storage cartridge. When the dosing unit is arranged as intended for use in an automatic dosing system, the outlet and the dosing device are at a lowest position of the dosing unit. This ensures that the gravity acting on the plurality of detergent tablets stored in the storage cartridge is employed for transporting the detergent tablets towards the dosing device. Further, gravity drives the detergent tablets out of the dosing device when being released. The dosing device may be snapped onto, clipped to, glued to, welded to, and/or screwed onto the storage cartridge.

For example, the inclined bottom side of the container includes an angle of between 70° to 25° with the gravitational vector, corresponding to an angle of 20° to 65° with the horizontal direction. Preferably, the angle is between 30° to 55°, more preferred between 40° to 50°, with respect to the horizontal direction. A gravitational force acting on a detergent tablet with mass m residing on the inclined bottom is given as $F_g=m\cdot g$, where g is the local gravitational acceleration (on earth's surface of the order of 9.81 m/s$^2$). The force component acting towards the dosing device, that is, parallel to the inclined bottom side, is given as $F_p=F_g\cdot\sin$ (inclination angle).

A larger inclination angle results in a larger force component, which assists in moving of the detergent tablets towards the dosing device. However, it also increases a total force acting parallel to the inclined bottom side on the foremost detergent tablet at the dosing device, which might get stuck or not transported as intended, and might even lead to a blocking of the dosing device or a malfunction of the dosing unit. Therefore, the inclination angle is preferably selected as a function of the frictional properties of the detergent tablets in the storage cartridge. In embodiments, an optimum angle allows for easily moving the detergent while reliable operation of the dosing unit is secured. Preferably, the inclination angle is chosen such that the detergent tablets are securely transported, that is, they slide off the bottom side towards the dosing device without further agitation.

The dosing device comprises at least a scoop and a plug. Preferably, the dosing device is attached to the storage cartridge on the outlet of the container by a specific fixing element. For example, the dosing device together with the fixing element may be called a dosing cap. The dosing cap preferably seals the container impermeably to fluids of all kinds, in particular humidity, and holds the dosing device including the scoop and plug in their desired operating position. For example, the fixing element includes a sealing portion for engagement with the storage cartridge or vice versa. In particular, the dosing device is held by the fixing element such that it can be rotated relative to the storage cartridge.

The scoop is configured for picking up or separating at least one detergent tablet from the plurality and transporting it to the receiving chamber formed in the plug or between the plug and the scoop. For this, the scoop is implemented to have certain reach, wherein detergent tablets within the reach can be picked up by the scoop. Preferably, the reach of the scoop is set such that a predefined number of detergent tablets, preferably exactly one detergent tablet, are picked up by the scoop. The scoop is implemented such that turning it in a certain direction about a rotational axis provides the separating and transporting functionality. Therefore, the scoop can be arranged rotatably in the dosing device, or the whole dosing device may be attached rotatably to the storage cartridge. The rotational axis is parallel to the bottom side. The term parallel as used in this case means that an angle between the bottom side and the rotational axis is less than 20°, less than 30°, or less than up to 45°.

The plug is configured for releasing the detergent tablet that is intermediately stored in the receiving chamber. For example, the plug includes a sliding mechanism or a turning mechanism that opens an outlet or the like, such that the detergent tablet falls out of the receiving chamber. The receiving chamber may be formed in the plug or it may be formed between the plug and the scoop and/or further elements of the dosing device.

In preferred embodiments, it is the combination of the scoop and the plug including the receiving chamber which effects the separation of a predetermined number, preferably exactly one, detergent tablets from the plurality of detergent tablets stored in the container.

The detergent tablets are preferably provided as formed bodies comprising a specific detergent formulation and having a specific size and geometry. The detergent tablets preferably comprise one or more active ingredients for an automatic washing process. As will be appreciated by the skilled person, the nature of the active ingredient(s) used in the detergent tablets will vary depending on the desired application. When used inside a dishwasher, the detergent tablets may, for example, comprise an active ingredient performing a dishwasher detergent, rinse aid, machine cleaner or dishwasher deodorizing function. In the context of laundry washing machines, the detergent tablets may, for example, comprise an active ingredient performing a laundry detergent or fabric softener function. Suitable active ingredients will be known to the skilled person; examples include bleach, bleach activator, bleach catalyst, enzyme, surfactant, builder, pH-adjusting agent, corrosion inhibitor, and fragrance.

For example, each detergent tablet contains a unit dose of the active ingredient, i.e. the entire amount of the active ingredient desired to be used in the washing process, such that only one detergent tablet of that active ingredient needs to be dispensed per washing process. In other embodiments, it may be an advantage for the unit dose of the active ingredient to be provided by more than one detergent tablet. For example, in some cases a single detergent tablet containing the entire unit dose may be rather large or heavy, and dosing may be more effective or reliable using multiple smaller or lighter detergent tablets. Preferably, the desired dose of the active ingredient is provided by no more than 10 detergent tablets, preferably no more than 9, 8, 7, 6, 5, or 4 detergent tablets. Preferably, the unit dose is provided by 1, 2, 3 or 4 detergent tablets. Another useful option is to provide detergent tablets each of which contains an amount of active ingredient that corresponds to no more than one unit dose of the active ingredient for at least one washing process of the automatic washing machine. For example, the dishwasher or washing machine is configured to allow selection between various different modes of operation, such as an intensive wash program and a light wash program, which require different amounts of the active ingredient. Thus, a number of detergent tablets may be dosed during one mode of operation and a different number of detergent tablets are dosed during a different mode of operation. For example, one detergent tablet may be dosed during a wash program for a certain soiling level and two detergent tablets during a wash program designed for a higher level of soiling.

The detergent tablets may be of any suitable form, such as solid, gel tab, or water-soluble package/container (preferably of low deformability). Preferably, at least the exterior of the detergent tablets are solid. For example, a capsule of a dissolvable (preferably hard) shell material could enclose a powder, liquid or gel composition. Advantageously, however, the detergent tablets are formed of a compressed powder. Each detergent tablet may, for example, be single phase or multi-layered, and may be otherwise structured to ensure that each active ingredient is released from the detergent tablet at the most optimal time. The detergent tablets may be wrapped in a film of water-soluble material, but preferably they are unwrapped. They may be coated with a suitable coating, e.g. to reduce friability. The detergent tablets may be of any suitable shape, such as cylindrical, disc-shaped, spherical, spheroidal, or cuboid. In an embodiment, each detergent tablet has at least one flat face. Preferably, the detergent tablets are cylindrical or disc-shaped, since spherical detergent tablets are more difficult to manufacture whilst shapes such as cuboid are less easily dispensed. In the case of a cylindrical detergent tablet, preferably the length of the tablet is up to 5% more or less than the diameter of the detergent tablet. When the detergent tablet has edges, preferably at least some of these edges are chamfered and/or filleted to reduce the liability to chip during manufacture and whilst the detergent tablet is in the dosing device. Preferably the chamfer has an angle of 15 to 20 degrees.

In an embodiment, each detergent tablet has a weight of: at least 0.1 g, at least 0.5 g, at least 0.7 g, at least 1 g, at least 1.2 g, at least 1.5 g, at least 2 g, at least 3 g, at least 4 g, or at least 5 g; and/or up to 15 g, up to 14 g, up to 13 g, up to 12 g, up to 1 1 g, up to 10 g, up to 9 g, up to 8 g, up to 7 g, or up to 6 g. In an embodiment, each detergent tablet has a maximum length and/or diameter of: at least 5 mm, at least 6 mm, at least 7 mm, at least 8 mm, at least 9 mm, or at least 10 mm; and/or up to 20 mm, up to 19 mm, up to 18 mm, up to 17 mm, up to 16 mm, or up to 15 mm.

Preferably, the detergent tablets are formed such that a high storage density in the storage cartridge can be achieved and the dosing function of the dosing device is supported. Further, the detergent tablets preferably have a form that is easily produced.

For example, the detergent tablets have a cylindrical shape, wherein a diameter and a height of the cylinder have similar dimensions, that is, an aspect ratio is of the order of 0.2-1.

The dosing unit has the advantage that it can be manufactured at low cost, such that when the storage cartridge runs empty of detergent tablets, the whole dosing unit can simply be replaced. A refilling of the storage cartridge may be possible, but is not necessary. It can be very convenient for a user of the water-bearing household appliance with the automatic dosing system to simply replace the whole dosing unit, which may be provided with different kinds of detergent tablets for different applications or different treatment programs.

According to an embodiment of the dosing unit, the plug is held in the dosing device movably between a closed position and a release position, wherein, when the plug is in the closed position, the detergent tablet received from the scoop is stored in the receiving chamber, and, when the plug is in the release position, an outlet in a side-wall of the dosing device is cleared such that the detergent tablet stored in the receiving chamber is released.

In embodiments, when the plug is in the closed position, a sealing element is engaged such that the dosing device is sealed impermeably to fluids of all kinds.

This can significantly reduce the input of fluids, especially of humidity, into the storage cartridge. This helps to prevent the detergent tablets from dissolving, decomposing and/or becoming sticky inside the storage cartridge. For example, the dosing device comprises specific sealing elements or sealing means for providing the seal.

Preferably, in its intended use, the dosing device is arranged such that the outlet is facing downwards when the plug is brought into the release position, such that the gravitational force pulls the detergent tablet out of the receiving chamber.

According to a further embodiment of the dosing unit, the scoop has a stirring element reaching into the storage cartridge for agitating the detergent tablets arranged within a range of the stirring element.

The stirring element has the advantage that the packing of the detergent tablets in the storage cartridge is kept loose. This way, a blocking of detergent tablets inside the container can be prevented. In particular, the stirring element may drive a circulation of the detergent tablets in the storage cartridge. Bridging of detergent tablets may be avoided this way.

The range of the stirring element and the reach of the scoop may identical, but may also be different. The detergent tablets arranged within the range of the stirring element are directly agitated or pushed by the stirring element, which are then pushed against further detergent tablets, such that effectively all detergent tablets in the storage cartridge are agitated.

According to a further embodiment of the dosing unit, the stirring element is configured for pushing the detergent tablets into the storage cartridge when the scoop is turned in the first rotational direction about the turning axis about a predefined turning degree.

This is advantageous, because the agitation by the stirring element and the separating function of the scoop are combined in this embodiment. Therefore, the dosing device is kept simple.

According to a further embodiment of the dosing unit, the stirring element is implemented in the scoop as a spirally curved surface section on its side facing towards the storage cartridge.

The spirally curved surface section has the effect that by turning the scoop about the rotational axis parallel to the bottom side, a height of the scoop at an eccentric position measured in a direction parallel to the rotational axis is a function of a turning degree of the scoop. In particular, the height increases steadily in the spirally curved surface section. After reaching a climax of the spirally curved surface section, preferably, a step is formed in the surface, such that the height of the scoop measured as a function of the turning degree has a step-like curve, stepping down to a smallest height value. The spirally curved surface section spans over a certain turning degree of the scoop, for example 90°, preferably at least 180°. Therefore, detergent tablets that are resting on the bottom side and are in contact with the spirally curved surface section are pushed upward the inclined bottom side, against gravity, by the scoop. When the scoop is turned further than the spanning degree of the spirally curved surface section, that is, the step in the height is crossed, the detergent tablets being pushed are suddenly free to slide back down along the bottom side the amount they were pushed upwards by the scoop. This push-and-release movement agitates, mixes and loosens the plurality of detergent tablets stored in the storage cartridge.

According to a further embodiment of the dosing unit, the spirally curved surface section has a pitch that is a function of the size of the detergent tablets, in particular 0.5-1.5 times the size of one detergent tablet.

The size of a detergent tablet is, for example, given by a largest cross-section of a detergent tablet or a largest diameter of a detergent tablet. This embodiment ensures a certain minimum agitation of the detergent tablets by the stirring element.

According to a further embodiment of the dosing unit, the scoop includes an eccentric opening on its side facing towards the storage cartridge, configured for guiding or channeling a detergent tablet into a separation chamber formed in the scoop, in the plug, or between the scoop and the plug.

Particularly, detergent tablets are guided into the separation chamber when the scoop is in a turning position such that the eccentric opening is at a lower side of the scoop.

The eccentric opening is preferably formed next to the spirally curved surface section, wherein the step is between the eccentric opening an the spirally curved surface section. Then, detergent tablets that slide down after being pushed upwards slide directly into the opening. The separating chamber is preferably implemented in the scoop such that it is at least partially arranged behind the spirally curved surface section, such that the surface separates the separation chamber from the plurality. In other words, detergent tablets need to follow a curved path for entering into the separation chamber from the storage cartridge. It is noted that the term separated does not necessarily mean that the separated detergent tablets are totally isolated from the plurality, but are in a position for being transported to the receiving chamber.

According to a further embodiment of the dosing unit, a barrier element is formed between the separation chamber and the receiving chamber, blocking a separated detergent tablet from moving from the separation chamber into the receiving chamber.

For example, the barrier element comprises a small lip or ridge. The barrier element preferably acts in both directions, that is, a detergent tablet that is contained in the receiving chamber cannot easily move back into the separation chamber. This ensures a reliable dosing operation.

According to a further embodiment of the dosing unit, the scoop includes a lifting element for lifting and transporting the separated detergent tablet from the separation chamber to the receiving chamber when the scoop is turned in the first turning direction about the rotational axis.

Particularly, the lifting element is configured for lifting the detergent tablet over the barrier element.

According to a further embodiment of the dosing unit, the receiving chamber is designed such that a predetermined number, preferably exactly one, of detergent tablets is stored in the receiving chamber at a given time.

Preferably, the receiving chamber has a volume that corresponds to that of one detergent tablet, for example. This ensures that exactly the predetermined number of detergent tablets is dosed in a dosing operation, increasing the reliability of the dosing unit.

According to a further embodiment of the dosing unit, a curvature of an edge of the container in a cross-section of the storage cartridge in a plane spanned by the rotational axis and the gravitational vector, when the storage cartridge is arranged as intended for use, is defined as a function of the size of the detergent tablets such that a jamming of detergent tablets against a side wall of the container when being pushed by the scoop is prevented.

In particular, a radius of a curvature has predefined minimum value, which depends on the size of the detergent tablets. The smaller the tablets, the smaller the minimum value can be. For example, in the case of cylindrical detergent tablets with a radius of the order of 5 mm and a height of the order of 10 mm, the minimum radius of curvature is selected from the range of 15-30 mm.

This embodiment ensures that the detergent tablets that are pushed by the scoop can flow freely inside the container and do not get pushed into a position where they could be confined between two tapering walls of the container. For example, if a detergent tablet is pushed onto a wall that is essentially perpendicular to the pushing direction, the detergent tablet doesn't move, but is exposed to compressive stress that might break it into pieces.

This can be avoided in this embodiment. Therefore, the embodiment enhances the secure and reliable operation of the dosing unit.

According to a further embodiment of the dosing unit, internal dimensions of the storage cartridge are selected such that a distance between any two parallel sides of the container is different to an integer multiplicity of a size of the detergent tablets.

Bridging of detergent tablets between to parallel sides is avoided in this embodiment, enhancing a secure and reliable operation of the dosing unit.

According to a further embodiment of the dosing unit, the dosing device comprises engagement means for engagement with a driving device of an external driving unit for turning the dosing device in the first turning.

Particularly, by turning the dosing device, the scoop is turned likewise.

According to a further embodiment of the dosing unit, the plug is shaped as a cylinder, wherein an engaging section for engagement with a driving element of the external driving unit is arranged on one face of the cylinder and the receiving chamber is arranged on the other face of the cylinder, wherein the plug is arranged in the dosing device such that the receiving chamber is facing towards the scoop.

According to a further embodiment of the dosing unit, the plug has an external thread that engages with an internal thread of the dosing device such that, when the plug is rotated relative to the dosing device in a first rotation direction about the rotational axis, the plug is moved from the closed position to the release position by being displaced laterally away from the scoop, and, when the plug is rotated relative to the dosing device in a second rotation direction oppositely the first rotation direction about the rotational axis, the plug is moved from the release position to the closed position by being displaced laterally towards the scoop.

This embodiment allows to move the plug easily by rotating the plug relative to the dosing device. Preferably, the dosing device is kept fixed in a predefined position and then the plug is rotated. In particular, the first turning direction of the scoop and the second rotation direction of the plug may be equal. Then, for example, by further rotating the plug in the second rotation direction when it is in the closed position and releasing the dosing device such that it is free to rotate, the dosing device including the scoop are turned with the plug. As an alternative to the rotation the plug could also be moved from the closed position to the release position by a linear movement.

In embodiments, the external thread on the plug is designed such that the plug is stopped by a radial stopper when moved from the closed position to the release position or vice versa. For example, the external thread on the plug does not extend from the one face until the other face of the cylinder, but ends before, forming a radial stopper at each end of the thread. Advantageously, the internal thread of the dosing device is specifically adapted in this embodiment. This embodiment has several advantages. First, the plug cannot be screwed out too far but is stopped at a predefined extension. Second, the plug is also stopped by the radial stopper when moved to the closed position, which ensures that the plug reaches a predefined closed position. Therefore, a sealing element for sealing the dosing device can be designed such that the seal is achieved securely when the plug is in the predefined closed position. This further allows to adjust the torque required for engaging or disengaging the seal, because a material contact or deformation for forming the seal is easily reproducible by the predefined closed position.

According to a second aspect, a water-bearing household appliance with an automatic dosing system and a dosing unit according to the first aspect is suggested. The automatic dosing system is configured for automatically dosing at least one detergent tablet from the dosing unit.

The dosing unit is implemented according to the first aspect. The automatic dosing system is specifically adapted to be used in conjunction with the dosing unit according to the first aspect, and the water-bearing household appliance is preferably implemented to control the dosing of detergent tablets from the dosing unit by controlling the automatic dosing system accordingly. For example, the water-bearing household appliance includes a control unit configured for controlling the operation of the water-bearing household appliance.

The features and advantages described with reference to the first aspect apply correspondingly to the second aspect as well. Furthermore, definitions and explanations provided with reference to the first aspect apply to the second aspect as well.

For example, the water-bearing household appliance is implemented as a dishwasher or a washing machine. The automatic dosing system with the dosing unit has the advantage that detergent for multiple treatment cycles can be provided, without the need to fill in detergent before each cycle. Preferably, the automatic dosing system is triggered automatically, for example by a control unit of the water-bearing household appliance. The detergent tablets may be any kind of detergent, that is, a chemical formulation that dissolves, at least partially, in a washing liquor for treating articles and is suitable for enhancing the treatment of the articles by the washing liquor. For example, the detergent includes enzymes, a bleaching agent, a softening agent, a rinse aid, and/or further detergents.

In preferred embodiments, the automatic dosing system is configured for removably receiving the dosing unit. For example, the automatic dosing system comprises a compartment for receiving the dosing unit in a predefined orientation. The predefined orientation corresponds to the orientation of the dosing unit when it is arranged as intended for use, as described above with reference to the first aspect.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

Figure 3:
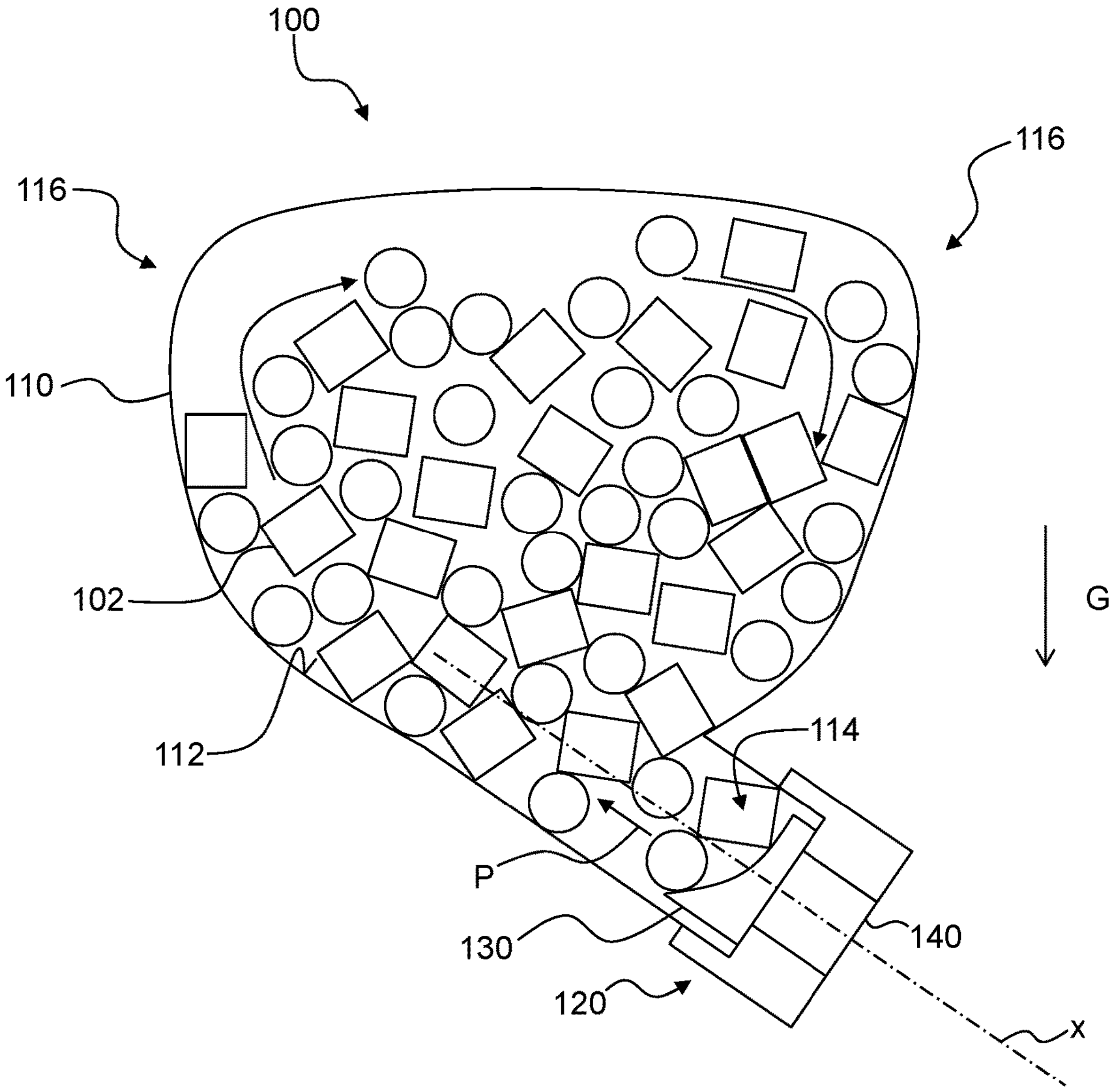
FIG. 3 shows a schematic view of a second example of a dosing unit.
Figure 4:
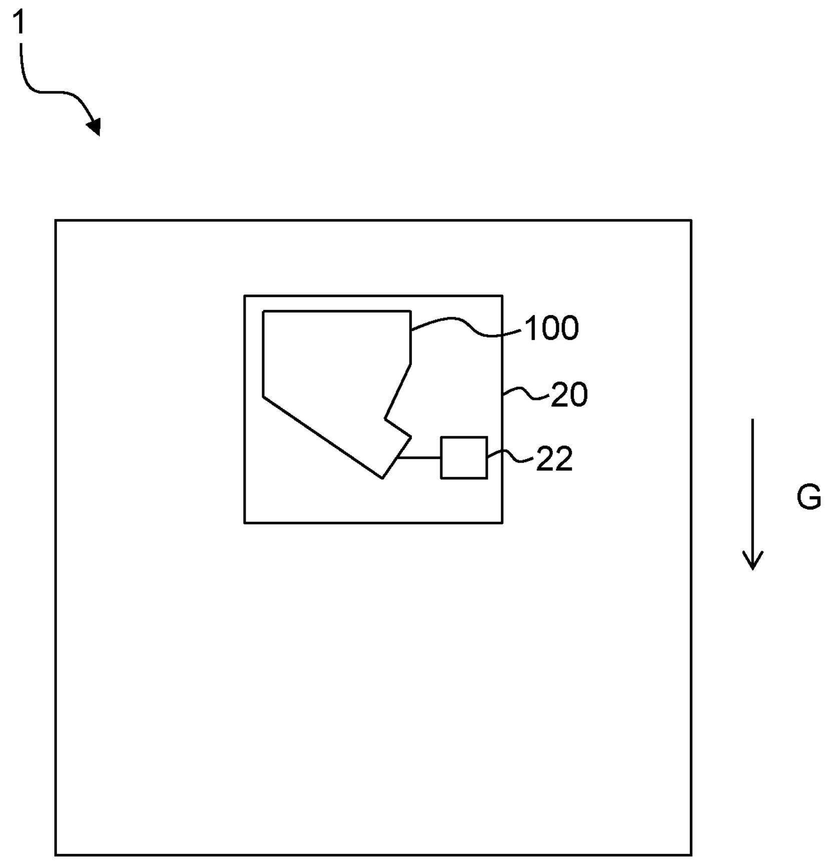
FIG. 4 shows a schematic view of a dosing unit employed in a water-bearing household appliance.
Figure 5:
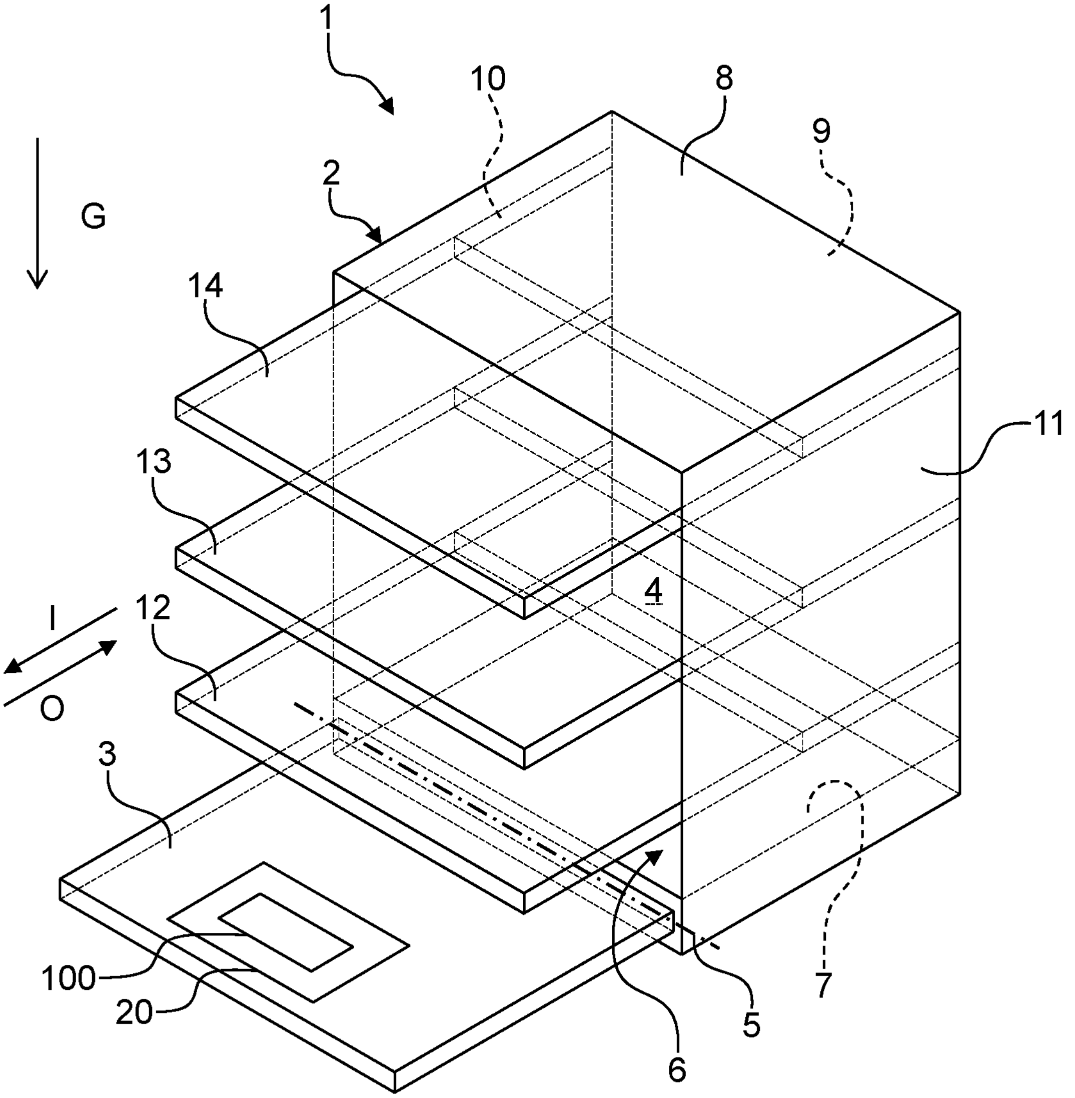
FIG. 5 shows a schematic perspective view of an example of a water-bearing household appliance.

Further embodiments, features and advantages of the present invention will become apparent from the subsequent description and dependent claims, taken in conjunction with the accompanying drawings, in which:

FIG. 1 shows a schematic view of a first example of a dosing unit;

FIG. 2A-2D show four different views of an example of a dosing device;

FIG. 3 shows a schematic view of a second example of a dosing unit;

FIG. 4 shows a schematic view of a dosing unit employed in a water-bearing household appliance; and FIG. 5 shows a schematic perspective view of an example of a water-bearing household appliance.

In the Figures, like reference numerals designate like or functionally equivalent elements, unless otherwise indicated.

FIG. 1 shows a first example of a dosing unit 100 for dosing a detergent tablet 102 (see FIG. 2A-2D or 3) provided by a storage cartridge 110. The storage cartridge 110 is implemented as a hollow body, the interior of which forms a container for storing a plurality of detergent tablets 102. The dosing unit 100 is shown in its orientation relative to gravity G as intended for use. It is noted that the dosing unit 100 may be operative in other orientations, in particular when only slightly deviating from the orientation shown here.

The bottom side 112 of the storage cartridge 110 is inclined with respect to a horizontal direction in this orientation, such that detergent tablets 102 do not rest on the bottom side 112, but slide towards an outlet 114 of the container.

A dosing device 120 is attached to the storage cartridge 110 at or on the outlet 114. The dosing device 120 includes a scoop 130 and a plug 140. Further, in a side wall of the dosing device 120, an outlet 122 is formed through which detergent tablets 102 stored in a receiving chamber 142 in the plug 140 may be released, assisted by gravity G. The dosing device 120 may be held by a fixing element such that the dosing device 120 can be rotated relative to the storage cartridge 110.

The dosing device 120 is attached to the storage cartridge 110 such that it can be rotated about rotational axis X, which is parallel to the bottom side 112 of the storage cartridge 110 in this example. However, the rotational axis X may be tilted with respect to the bottom side 112 to some degree, for example, up to 45°, without affecting the dosing device's 120 dosing function.

As can be seen, the scoop 130 has a stirring element 132 implemented as a surface towards storage cartridge 110 that is not orthogonal to the rotational axis X. Particularly, the stirring element 132 is implemented as a spirally curved surface section, which protrudes into the storage cartridge 110. Detergent tablets 102 stored in the storage cartridge 110 are in contact with the scoop 130, because the scoop 130 is arranged in a lowest position of the storage cartridge 110. When the scoop 130 is turned about rotational axis X, the stirring element 132 agitates the detergent tablets 102. In this case, the spirally curved surface section pushes the detergent tablets 102 in a direction away from outlet 114, upward the inclined bottom side 112. Therefore, detergent tablets 102 in the storage cartridge 110 are agitated and mixed, which prevents detergent tablets 102 from forming bridges or blocking each other. The stored detergent tablets 102 are kept in a loose packing in this way, such that they move easily in the container, in particular towards the outlet 114, driven by gravity G. An example of the operation of the dosing device 120 is described in the following with respect to FIG. 2A-2D.

FIG. 2A-2D show four schematic views of an example of a dosing device 120, which can be used in the dosing unit 100 according to FIG. 1, 3 or 4. For better overview, the storage cartridge 110 is not shown in FIGS. 2A-2D, however, it is assumed, that the dosing device 120 is attached to a storage cartridge 110 as shown in FIG. 1 or 3, which provides detergent tablets 102.

Figure 2A:
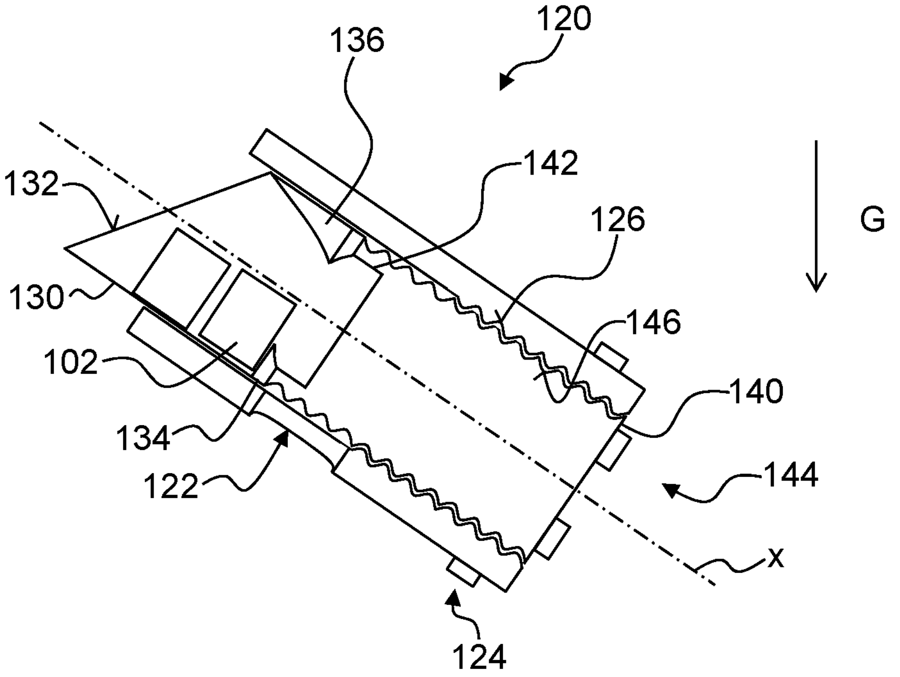
FIG. 2A-2D show four different views of an example of a dosing device.

FIG. 2A shows the dosing device 120 in a state and orientation as shown in FIG. 1. The dosing device 120 has engagement means 124 for engagement with an external driving unit 22 of an automatic dosing system 20 (see FIG. 4). The plug 140 has a cylindrical shape with a receiving chamber 142 formed in the face facing towards the scoop 130 and an engaging section 144 for engagement with a driving element of the external driving unit 22 arranged on the other face. Further, the plug 140 has an external thread 146 in at least a section of its outer circumference, which is engaged with an internal thread 126 formed in the dosing device 120. By rotating the plug 140 relative to the dosing device 120 about the rotational axis X, the plug 140 can be moved in and out from the dosing device 120, thus closing or clearing the outlet 122 formed in the dosing device 120. In FIG. 2A, the plug 140 is shown in the closed position, in which it seals the dosing device 120 impermeably to fluids.

The dosing device 120 is implemented such that the whole dosing device 120 including the scoop 130 and the plug 140 can be turned about the rotational axis X. Additionally, the plug 140 can be turned relative to the dosing device 120, while the scoop 130 is fixed. In FIG. 2A, two detergent tablets 102 are shown, which are arranged in a separating chamber formed in the scoop 130. The detergent tablets 102 are held back from moving into the receiving chamber 142 by a barrier element 134 in this orientation.

Figure 2B:
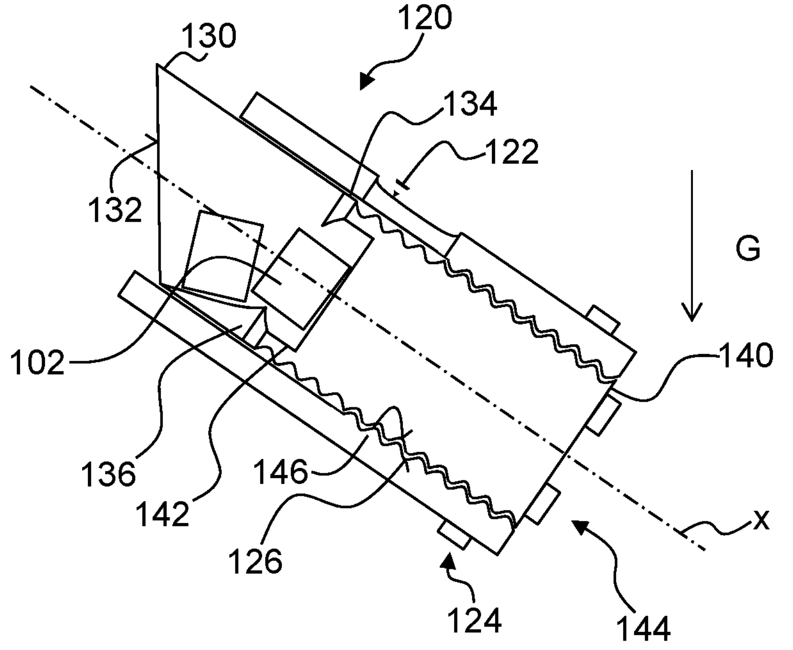

FIG. 2B shows the dosing device 120 in an orientation after the dosing device 120 was turned about 180° about the rotational axis X compared with the orientation shown in FIG. 2A. By turning the dosing device 120, one of the detergent tablets 102 was lifted by a lifting element 136 formed in the scoop 130, such that it is transported into the receiving chamber 142 formed in the plug 140. The second detergent tablet 102, however, cannot move into the receiving chamber 142, because it is now occupied by the first detergent tablet 102.

Figure 2C:
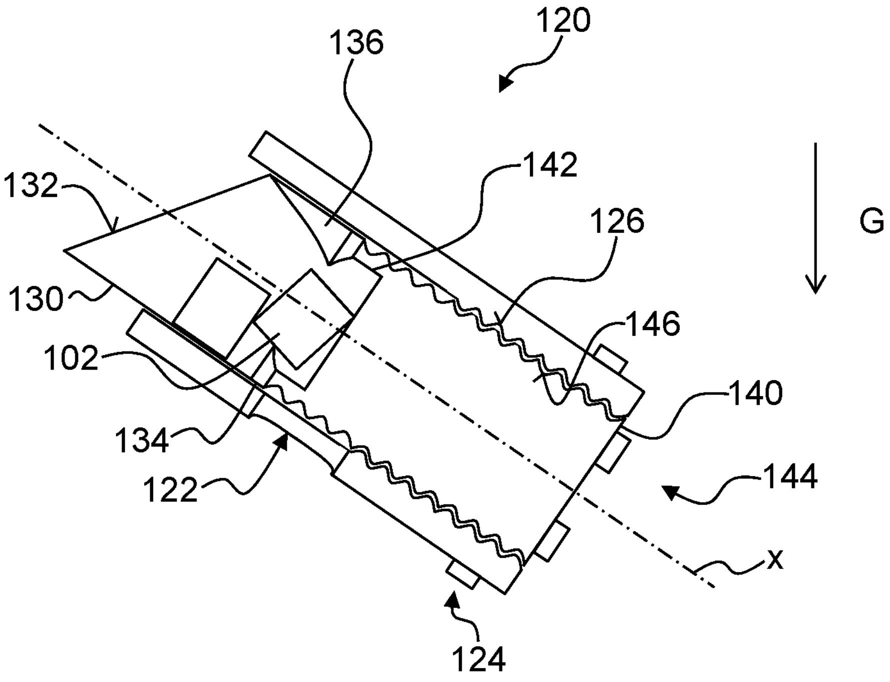

FIG. 2C show the dosing device 120 after further turning the dosing device 120 about the rotational axis X by 180° compared with FIG. 2B, in the same turning direction. Now, the detergent tablet 102 in the receiving chamber 142 is clearly separated from the second detergent tablet 102 by the barrier element 132.

Figure 2D:
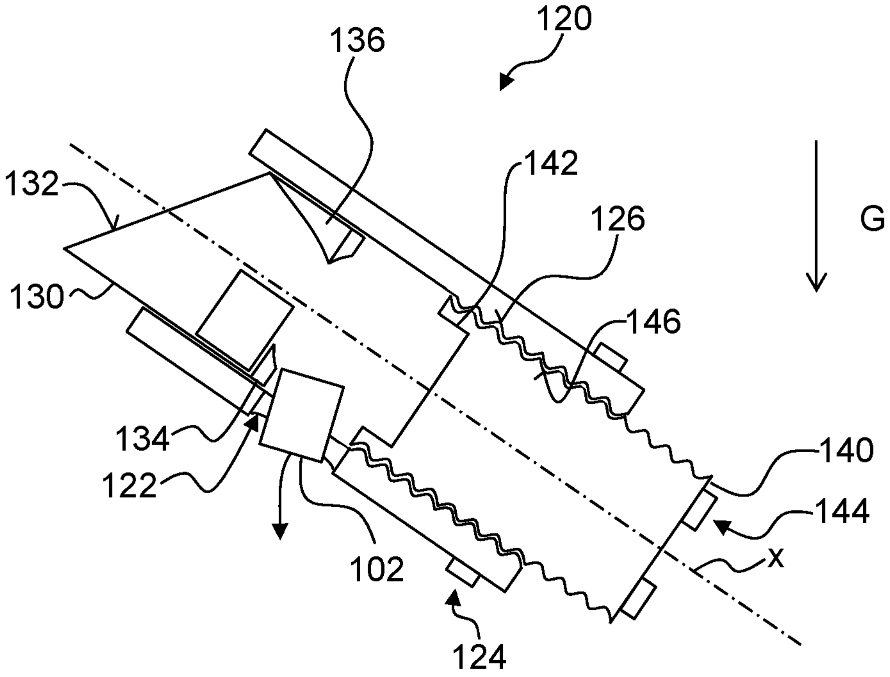

FIG. 2D shows the dosing device 120 in the same orientation as in FIG. 2A or 2C, but the plug 140 was moved to the release position. For this, the dosing device 120 was kept rotationally fixed and the plug 140 was rotated relative to the dosing device 120. The detergent tablet 102 is released from the receiving chamber 142 and falls out, through the opening 122. Thus, the dosing of exactly one detergent tablet 102 is completed. Now, the plug 140 is returned to the closed position, and separating and transporting of a detergent tablet 102 into the receiving chamber 142 may be repeated as described.

FIG. 3 shows a second example of a dosing unit 100. The dosing unit 100 is shown in the orientation as intended for use with respect to gravity G. The storage cartridge 110 is filled with a plurality of detergent tablets 102 (only one detergent tablet 102 is marked with reference numeral for better overview). A dosing device 120, for example the dosing device 120 described with reference to FIG. 1 or FIG. 2A-2D, is attached to the storage cartridge 110 on an outlet 114, which is arranged at a lowest position of the bottom side 112 of the storage cartridge 110.

The scoop 130 agitates or pushes the detergent tablets 102 arranged next to it as indicated by arrow P, when being rotated. This push is transferred to the plurality of detergent tablets 102 stored in the storage cartridge 110. In this embodiment, the storage cartridge 110 is designed in curvature sections 116 such that a minimum curvature of the container allows detergent tablets 102 to slide along, without the risk of blocking. Therefore, a mixing and circulation of detergent tablets 102 stored in the storage cartridge 110 takes place due to the agitation by the stirring element 132 of the scoop 130, as is indicated by the arrows in FIG. 3.

FIG. 4 shows a dosing unit 100 employed in a water-bearing household appliance 1. The water-bearing household appliance 1 is implemented as a dishwasher, for example. The dishwasher 1 has an automatic dosing system 20, which is arranged on a door of the dishwasher 1. The automatic dosing system 20 is implemented to be operated with a dosing unit 100 as described with reference to FIG. 1 or 3. In particular, the automatic dosing system 20 is configured for removably receiving the dosing unit 100 and has a driving unit 22. The driving unit 22 is configured for engaging with the engagement means 124 of the dosing device 120 and has a driving element for engagement with the engagement section 144 of the plug 140. Particularly, the driving unit 22 is implemented for turning the dosing device 120 as whole and to hold the dosing device 120 fixed while rotating the plug 140 relative to the dosing device 120. Therefore, the automatic dosing system 20 is implemented for automatically dosing a detergent tablet 102 from the dosing unit 100.

FIG. 5 shows a schematic perspective view of an example of a water-bearing household appliance 1, which is implemented as a domestic dishwasher. The domestic dishwasher 1 comprises a tub 2, which can be closed by a door 3. Preferably, the door 3 seals the tub 2 so that it is waterproof, for example by using a door seal between door 3 and the tub 2. Preferably, the tub 2 has a cuboid shape. Tub 2 and door 3 can form a washing chamber 4 for washing dishes.

In FIG. 5, door 3 is shown in the open position. By swiveling about an axis 5 at a lower edge of door 3, the door 3 can be opened or closed. With the door 3, an opening 6 of the tub 2 for inserting dishes into the washing chamber 4 can be opened or closed. Tub 2 comprises a lower cover 7, an upper cover 8 facing the lower cover 7, a rear cover 9 facing the closed door 3 and two side covers 10, 11 which face each other. For example, the lower cover 7, the upper cover 8, the rear cover 9 and the two side covers 10, 11 can be made from stainless steel sheets. Alternatively, at least one of the covers, for example the lower cover 7, can be made from a polymeric material, such as plastic.

The domestic dishwasher 1 further has at least one rack 12, 13, 14 on which dishes to be washed can be placed. Preferably, more than one rack 12, 13, 14 is used, wherein rack 12 can be lower rack, rack 13 can be an upper rack and rack 14 can be a rack specific for cutlery. As is shown in FIG. 5, the racks 12 to 14 are arranged vertically above each other in the tub 2. Each rack 12, 13, 14 can be pulled out from the tub 2 in a first, outward direction O or pushed into the tub 2 in a second, inward direction I.

FIG. 5 further shows an automatic dosing system 20 that is arranged in the door 3 of the domestic dishwasher 1. The automatic dosing system 20 comprises a dosing unit 100 that is removably fixed in the automatic dosing system 20. The dosing unit 100 may be configured according to one of FIG.

1 or 3. The automatic dosing system 20 has a driving unit 22 (see FIG. 4) configured to actuate the dosing unit 100 for automatically dosing a detergent tablet 102 (see FIG. 2A-2D or 3) provided by a storage cartridge 110 (see FIG. 1 or 3) of the dosing unit 100. Preferably, the automatic dosing system 20 is controlled by a control unit (not shown), which is implemented for operating the domestic dishwasher 1 according to a treatment program selected from a plurality of treatment programs. Further, in preferred embodiments, the automatic dosing system 20 may include a case for removably receiving the dosing unit 100 for protecting the dosing unit 100 from the surrounding conditions, in particular heat and humidity. Additionally, the automatic dosing system 20 may comprise a dosing channel, wherein the dosing unit 100 releases the detergent tablet 102 into the dosing channel, which is implemented for guiding the released detergent tablet 102 into the washing chamber 4.

Although the present invention has been described in accordance with preferred embodiments, it is obvious for the person skilled in the art that modifications are possible in all embodiments.

REFERENCE NUMERALS 1 water-bearing household appliance
2 tub
3 door
4 washing chamber
5 axis
6 opening
7 lower cover
8 top cover
9 rear cover
10 side cover
11 side cover
12 rack
13 rack
14 rack
20 automatic dosing system
22 driving unit
100 dosing unit
102 detergent tablet
110 storage cartridge
112 bottom side
114 outlet
116 curvature section
120 dosing device
122 outlet
124 engagement means
126 thread
130 scoop
132 stirring element
134 barrier element
136 lifting element
140 plug
142 receiving chamber
144 engaging section
146 thread
G gravity
I direction
O direction
P arrow
X rotational axis

The invention claimed is:

1. A dosing unit for automatically dosing at least one detergent tablet, the dosing unit comprising:
a storage cartridge; and
a dosing device comprising a scoop and a plug,
the dosing unit configured for storing a plurality of detergent tablets, the storage cartridge further configured for use in an automatic dosing system of a water-bearing household appliance,
wherein the storage cartridge comprises a container with a bottom side forming an inclination angle with a horizontal direction when the dosing unit is arranged as intended for use,
wherein an outlet is formed in the container at a lower end of the bottom side, such that detergent tablets on the bottom side of the container move towards the outlet driven by gravity, and
wherein the dosing device is attached to the storage cartridge on the outlet,
wherein the scoop is configured to separate a detergent tablet from the plurality of detergent tablets and transport the separated detergent tablet to a receiving chamber formed in the plug when the scoop is turned in a first turning direction about a rotational axis that is parallel to the bottom side,
wherein the plug is configured to release the separated detergent tablet from the receiving chamber, wherein the plug has an external thread that engages with an internal thread of the dosing device such that, when the plug is rotated relative to the dosing device in a first rotation direction about the rotational axis, the plug is moved from a closed position to a release position by being displaced laterally away from the scoop, and
when the plug is rotated relative to the dosing device in a second rotation direction opposite to the first rotation direction direction about the rotational axis, the plug is moved from the release position to the closed position by being displaced laterally towards the scoop.

2. The dosing unit according to claim 1, wherein the plug is held in the dosing device being movable between a closed position and a release position, wherein, when the plug is in the closed position, the separated detergent tablet received from the scoop is stored in the receiving chamber, and, when the plug is in the release position, an outlet in a side-wall of the dosing device is cleared such that the separated detergent tablet stored in the receiving chamber is released.

3. The dosing unit according to claim 1, wherein the scoop comprises a stirring element reaching into the storage cartridge configured for agitating the plurality of detergent tablets arranged within a range of the stirring element when the scoop is turned in the first turning direction about the rotational axis.

4. The dosing unit according to claim 3, wherein the stirring element is configured for pushing the plurality of detergent tablets into the storage cartridge when the scoop is turned in the first turning direction about the rotational axis about a predefined turning degree.

5. The dosing unit according to claim 4, wherein the stirring element is implemented in the scoop as a spirally curved surface section on a side of the scoop facing towards the storage cartridge.

6. The dosing unit according to claim 5, wherein the spirally curved surface section has a pitch that is a function of the size of the detergent tablets, in particular 0.5-1.5 times the size of one detergent tablet.

7. The dosing unit according to claim 3, wherein the scoop further comprises an eccentric opening on a side of the scoop facing towards the storage cartridge, configured for guiding a detergent tablet of the plurality of detergent tablets into a separation chamber formed in the scoop, in the plug, or between the scoop and the plug.

8. The dosing unit according to claim 7, wherein a barrier element is formed between the separation chamber and the receiving chamber, the barrier element configured for blocking the separated detergent tablet from moving from the separation chamber into the receiving chamber.

9. The dosing unit according to claim 8, wherein the scoop further comprises a lifting element configured for lifting and transporting the separated detergent tablet from the separation chamber to the receiving chamber when the scoop is turned in the first turning direction about the rotational axis.

10. The dosing unit according to claim 1, wherein the receiving chamber is designed such that a predetermined number of separated detergent tablets is stored in the receiving chamber at a given time.

11. The dosing unit according to claim 1, wherein when the storage cartridge is arranged as intended for use, a curvature of an edge of the container in a cross-section of the storage cartridge in a plane spanned by the rotational axis and the gravitational vector, is defined as a function of the size of the plurality of detergent tablets such that a jamming of the plurality of detergent tablets against a side wall of the container when being pushed by the scoop is prevented.

12. The dosing unit according to claim 1, wherein internal dimensions of the storage cartridge are selected such that a distance between any two parallel sides of the container is different to an integer multiplicity of a size of the detergent tablets.

13. The dosing unit according to claim 1, wherein the dosing device comprises an engagement element configured for engagement with a driving device of an external driving unit configured for turning the dosing device in the first turning direction.

14. The dosing unit according to claim 13, wherein the plug is shaped as a cylinder, wherein an engaging section configured for engagement with a driving element of the external driving unit is arranged on a face of the cylinder and the receiving chamber is arranged on another face of the cylinder, and wherein the plug is arranged in the dosing device such that the receiving chamber is facing towards the scoop.

15. A water-bearing household appliance with an automatic dosing system and a dosing unit according to claim 1, the automatic dosing system being configured for automatically dosing at least one detergent tablet from the dosing unit.

16. The dosing unit according to claim 10, wherein one separated detergent tablet is stored in the receiving chamber at a given time.

* * * * *